Feb. 20, 1940.   W. TRIBLE   2,191,137
HEADSTOCK POSITIONING MECHANISM
Filed Oct. 20, 1937   3 Sheets-Sheet 2
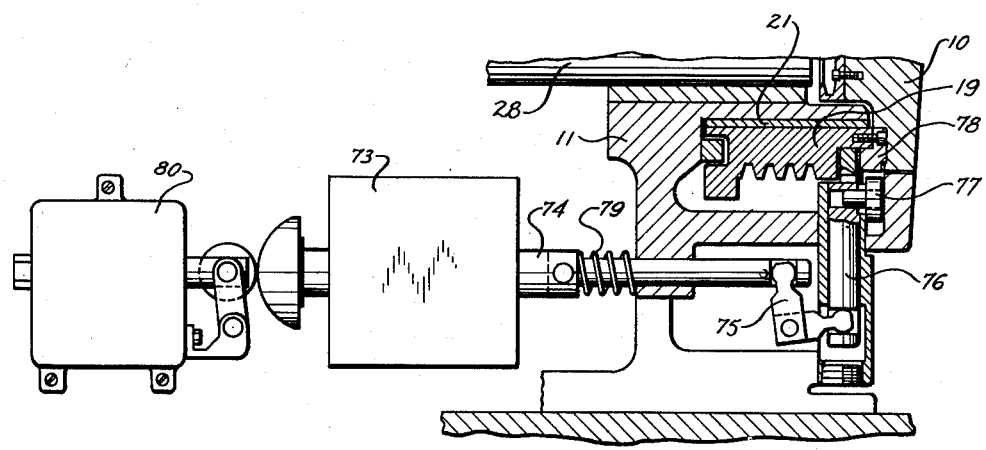
Fig. 3
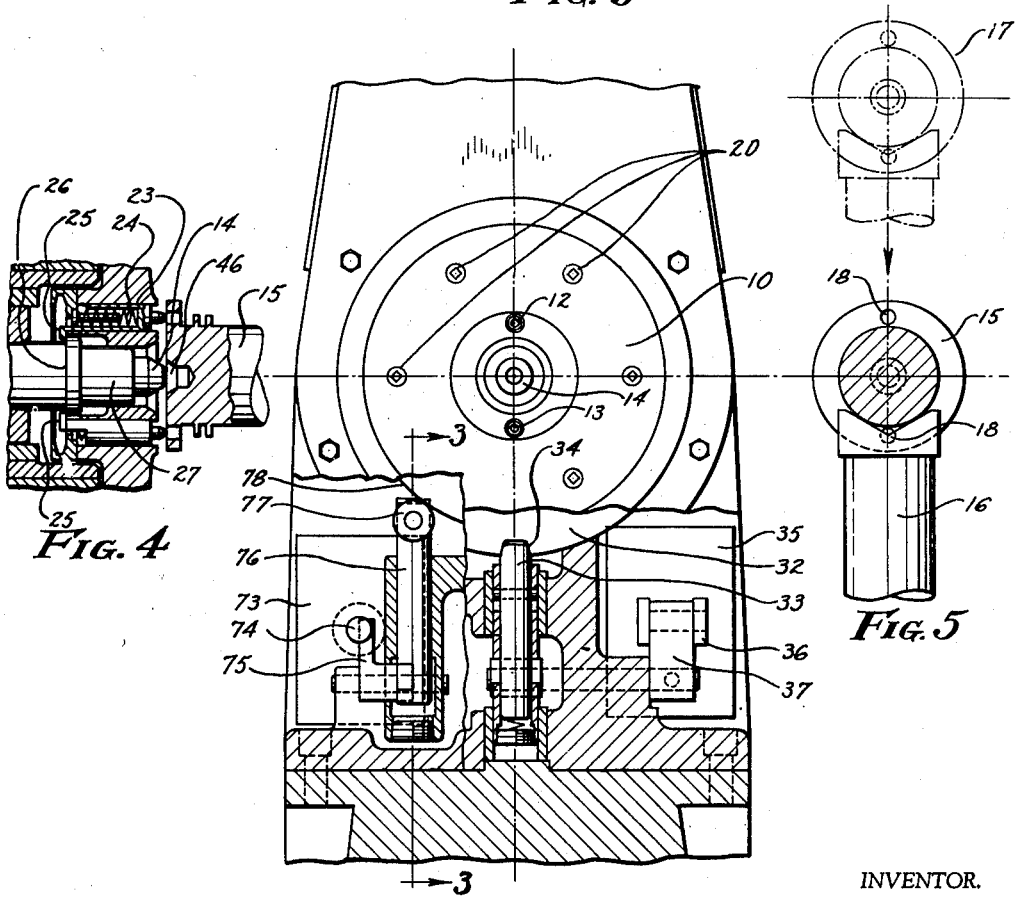
Fig. 4
Fig. 2
Fig. 5
INVENTOR.
WINTHROP TRIBLE
BY
H. K. Parsons
ATTORNEY.

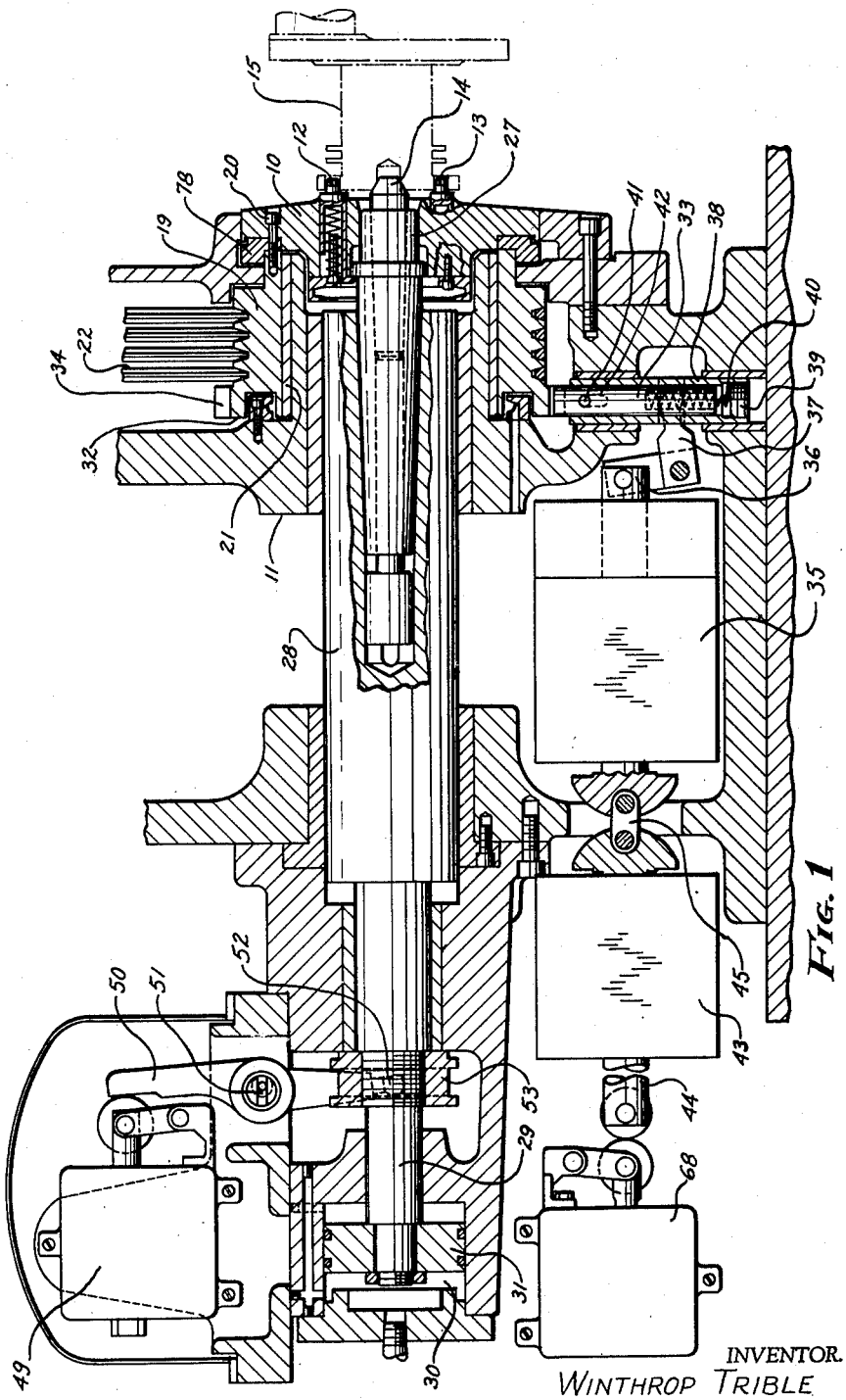

Feb. 20, 1940.            W. TRIBLE                2,191,137
              HEADSTOCK POSITIONING MECHANISM
              Filed Oct. 20, 1937        3 Sheets-Sheet 3
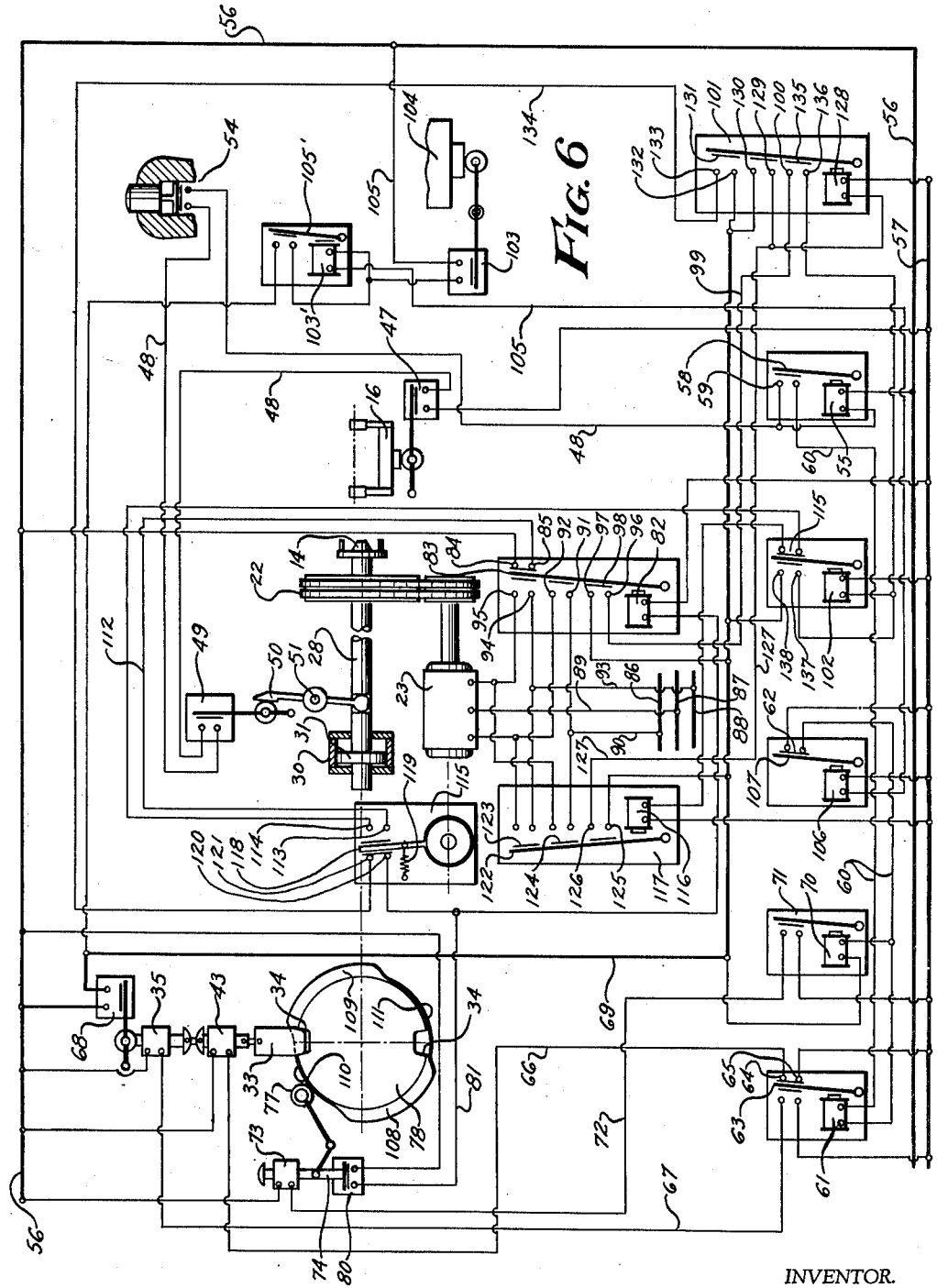
INVENTOR.
WINTHROP TRIBLE
BY
AHK Parsons
ATTORNEY.

Patented Feb. 20, 1940

2,191,137

UNITED STATES PATENT OFFICE 2,191,137

HEADSTOCK POSITIONING MECHANISM

Winthrop Trible, Cincinnati, Ohio, assignor to Cincinnati Grinders Incorporated, Cincinnati, Ohio, a corporation of Ohio Application October 20, 1937, Serial No. 170,067

9 Claims. (Cl. 82—28)

This invention relates to machine tools and more particularly to improvements in transmission and control mechanism for actuation of the headstocks thereof.

One of the problems in the automatic production of work on center type machine tools having automatic loading fixtures, is to effect engagement of the driving pins with the work at the same time that the centers are inserted in the work, and without the necessity of effecting relative angular adjustment between the face plate of the machine and the work for alignment purposes. This problem becomes especially difficult when engagement can only be effected in one predetermined angular position of the work.

One of the objects of this invention is to provide a transmission and control mechanism for the work rotating means in the headstock of a machine tool which will automatically stop the headstock in any predetermined angular position, whereby a driving pin may be inserted in a predetermined hole in the work without attention on the part of the operator.

Another object of this invention is to provide an automatic work rotator positioning mechanism which will automatically stop the rotator and lock it in the same angular position each time.

Another object of this invention is to provide a headstock control mechanism which will automatically unlock the headstock upon presentation of a work piece thereto.

A further object of this invention is to provide a headstock control mechanism which will automatically function upon completion of the machining operation to bring the rotor of the headstock to a predetermined angular stop.

Other objects and advantages of the present invention should be readily apparent by reference to the following specification considered in conjunction with the accompanying drawings illustrative of one embodiment thereof, but it will be understood that any modifications may be made in the specific structural details within the scope of the appended claims without departing from or exceeding the spirit of the invention.

Referring to the drawings in which like reference numerals indicate like or similar parts:

Figure 1 is a sectional view through a headstock embodying the principles of this invention.

Figure 2 is an end view partly in section of the headstock shown in Figure 1, and as viewed from the right end of that figure.

Figure 3 is a detail section on the line 3—3 of Figure 2.

Figure 4 is a detail section showing the work center and driving pins in retracted position.

Figure 5 is a detail view showing the manner of presenting a work piece to the headstock and the relationship of the driving pin holes therein with respect to a vertical plane.

Figure 6 is a diagrammatic view of the electrical control circuit for governing automatic positioning of the headstock including the necessary interlock controls with the work loading attachment and with the tooling element.

Referring to Figure 1, the reference numeral 10 indicates the face plate of a machine tool headstock indicated generally by the reference numeral 11, said face plate carrying work driving pins 12 and 13 which are rotatable about a work supporting center 14. The work supporting center and the driving pins are retractable to the position shown in Figure 4, to permit a work piece 15 to be inserted between the center 14 and a retractable tailstock center, not shown.

For explanatory purposes, it is assumed that the work is moved by an elevator 16 downward in a vertical plane from some upper elevator loading position, such as shown in dash and dot lines in Figure 5 and indicated generally by the reference numeral 17, to a machine loading position indicated by the full lines wherein the axis of the work is in co-axial alignment with the center of the headstock. It is also assumed that the work piece 15 is provided with two holes 18 located in the end thereof which are suitable for receiving the driving pins and that the work is always loaded in the elevator 16 with these two holes lying in a predetermined plane, in the present instance, a vertical plane. If it is therefore assumed that the work is always presented to the headstock with the driving pin receiving holes always lying in a vertical plane, it is desirable that the rotor of the headstock always be stopped with the driving pins lying in a vertical plane so that when the next work piece is presented thereto, the driving pins may be inserted in the holes without the necessity of making angular adjustment of either the work or the rotor.

Referring to Figure 1, the face plate 10 is secured to a driving pulley 19 by suitable means, such as cap screws 20, and the pulley is supported for rotation on a bearing portion 21 of the headstock. The pulley 19 may be connected, as by a plurality of V-belts 22, to a driving pulley of an electric motor, said electric motor being indicated by the reference numeral 23 is Figure 6. The driving pins 12 and 13 are slidably mounted in bores 23 formed in the face plate, Figure 4, and are normally urged outward by springs 24 mounted in a blind bore formed in the end of the pin. The inward ends of the pins are provided with lugs 25 which engage a shoulder 26 formed on the periphery of a collet 27 which has a central tapered bore in which the center 14 is frictionally held. The collet 27 is frictionally held in a tapered bore formed in the end of a reciprocable plunger 28. The end of this plunger is reduced at 29 to form a piston rod which passes into a cylinder 30 and connected to a piston 31 contained therein. It will now be apparent that upon admission of pressure to one end or the other of the cylinder that the plunger 28 will be reciprocated, and it should be noted, that upon retraction of the plunger 28, that the shoulder 26 will, by virtue of engagement with the lugs 25, effect retraction of the driving pins 12 and 13, as well as the work supporting center 14.

It will be noted that no rotating driving engagement is provided between the face plate and the collet 27 whereby the face plate and driving pins rotate alone.

Since the driving pins must lie in a prescribed angular position in order to engage the holes of the work in a positive manner, means have been provided for locking the rotatable driving members in this position, so as to prevent inadvertent movement of the face plate during reciprocation of the center and driving pins. This mechanism comprises a locking plate 32 and a locking plunger 33, the plate being formed integral with the driving pulley 19 for convenience of manufacture, although it will be apparent that the plate could be made as a separate member. This plate is provided with two diametrically opposite notches 34 for receiving the tapered end of the locking plunger.

It will be apparent that the number of notches in the locking plate will depend upon the number of holes in the work, providing they are equally spaced, because the greater the number of holes in the work the greater the number of possible positions in which the headstock may be stopped. Therefore the showing of two holes in the work is to be considered as illustrative of the invention and not as a limitation thereon.

It will be apparent that in order to rotate the face plate that the locking plunger must be withdrawn. An electrical solenoid 35 is provided for this purpose, and as shown in Figure 1, the plunger 36 of this solenoid is connected by a bell crank 37 for actuation of the locking plunger. The plunger 33 is actually mounted in a sleeve 38 which is closed at one end by a plug 39, and a spring 40 is interposed between this plug and the lower end of the plunger for continuously urging the same outward. A limit pin 41 is driven diametrically through the locking plunger 33, and is of sufficient length that the ends thereof project into elongated slots 42 formed in the sleeve 38. This limits the amount of movement of the plunger 33 in one direction with respect to the sleeve but permits movement relative to the sleeve in the opposite direction. The sleeve is positively actuated, and if the notch 34 is not aligned with the end of the pin, the plunger stops while the sleeve continues to move compressing spring 40. When alignment is obtained, the plunger snaps into position.

The solenoid 35 is provided for positively withdrawing the locking plunger, when it is energized. A second solenoid 43 is provided for inserting the locking plunger and this solenoid has a plunger 44 which is supported in axial alignment with the plunger 36 and connected thereto by links 45. When the solenoid 43 is energized, the bell crank 37 is rotated in a counterclockwise direction.

The electrical control circuit which governs these solenoids, as well as rotation of the face plate is shown in Figure 6. For purposes of explanation, it will be assumed that the face plate is stopped and locked in a position ready to receive a work piece and that the headstock center and driving pins are retracted, or in other words, that fluid pressure is present in the right hand end of cylinder 30. The work piece moves downward on the elevator 16 until the axis of the center hole 46 in the end of the work is in alignment with the work supporting center 14, or in other words, to the position shown in Figure 4. As this position is reached, the work elevator 16 closes a switch 47 which is serially connected in the electrical circuit 48.

The pressure in cylinder 30 is reversed, by suitable valve means not shown, and the work supporting center and the driving pins engage the end of the work piece. Movement of plunger 28 closed a limit switch 49 which by means of a crank 50, which is pivotally supported at 51, and has a ball shaped end 52 engaging an annular collar 53 fixed with the plunger 28. The switch 49 is also serially connected in the circuit 48 which also has a starting push button 54 and a relay coil 55 serially connected therein. One end of the circuit 48 is connected to the power main 56, and the other end of the circuit is connected to the power main 57. It will now be apparent that when the switches 47 and 49 have been closed that the push button 54 may be operated to energize the relay coil 55.

The operator starts rotation of the work by depressing the push button. Relay coil 55 is energized, and closes the relay switch 58 whereby the power line 56 is connected through relay coil 55 and contact 59 to circuit 60, which has a relay coil 61 serially connected therein. This circuit returns to the power line 57 through the normally closed relay switch 62. It will now be apparent that when the push button switch is closed by the operator, that the relay coil 55 is energized to close switch 58, and that the closing of switch 58 completes a holding circuit for the relay coil 55 through the relay coil 61 and switch 62, so that the push button may now be released without de-energizing the relay coil 55.

A relay switch 63, operable by the relay coil 61, has a pair of back contacts 64 and 65, which, when the relay coil 61 is de-energized, completes a circuit 66 from power line 57 through the solenoid 43 to the power line 56. Thus the locking plunger 33 is held in position to lock the face plate against rotation. But when switch 63 is thrown, it opens circuit 66, de-energizing solenoid 43; and closes circuit 67 from power line 57 through solenoid 35 to power line 56. Energization of solenoid 35 effects retraction of locking plunger 33, and the face plate is free to rotate. A limit switch 68 is supported in alignment with the solenoids whereby energization of solenoid 35 will close limit switch 68, and thereby connect the power line 56 through a circuit 69 to relay coil 70, which is connected through circuit 60 to power line 57 through switch 62. Relay coil 70 closes the relay switch 71 and thereby connects power line 57 through circuit 72 and solenoid 73 to power line 56.

As shown in Figure 3, the solenoid 73 has a plunger 74 which is operatively connected through a bell crank 75 to a pin 76 which carries a roller 77 on the end thereof. This roller is adapted to engage the periphery of a control cam 78, the purpose of which will be explained hereafter. A spring 79 is interposed between a shoulder on the plunger 74 and the casting for normally holding the parts in the position shown in Figure 3.

When solenoid 73 is energized through the closing of switch 71, the plunger 74 moves toward the right as viewed in Figure 3, and permits closing of a limit switch 80. It also effects withdrawal of the roller 77 out of contact with the periphery of control cam 78. Closing of limit switch 80 completes a circuit 81 from power line 56 through starting relay coil 82 to power line 57. This energizes the relay 82 and throws the starting switch member 83 which opens the circuit between a pair of back contacts 84 and 85 without effect, and closes the circuit on the other side to start rotation of the electric motor 23.

The motor 23 is a three-phase motor, and a three-phase supply is provided therefor consisting of power mains 86, 87 and 88. The power main 87 is permanently connected by a line 89 to the motor. Power main 86 is connected by line 90 and closed contacts 91 and 92 to the motor, and the power main 88 is connected by line 93 and closed contacts 94 and 95 to the motor. This will cause rotation of the motor and thereby of the face plate in one direction. An additional pair of contacts 96 and 97 are interconnected by a contactor 98 on the switch member 83, which completes a circuit from power main 56 through switch 68 and circuit 69 to circuit 99 which terminates in contact 100 of switch 101. Since switch 101 is open at this time, the circuit is not completed to a relay coil 102.

From the description of the circuit so far it will be seen that two things must happen before the circuit is conditioned for starting, that is, the work elevator must be in a proper position, and the centers and drivers must be in engagement with the work. Thereafter a series of relays operate in sequence to effect, first, a withdrawal of the locking plungers from the locking plate; second, withdrawal of the follower roller 77 from contact with the control cam 78; and third, closing of the starting switch for the motor which results in rotation of the work.

After the machining operation has been completed, which may be determined automatically by providing a limit switch 103 for actuation by the tooling element 104, a circuit 105 will be completed from power main 56 through switch 103, relay coil 103', to relay coil 106. Energization of relay coil 103' closes the switch 105' and thereby establishes a holding circuit for coils 103' and 106 through switch 68. The tooling element may now move out of contact with the work, and although switch 103 opens, it will produce no effect. The relay 106 operates a switch member 107 which normally is in a position to close switch 62 through which circuit 60 is completed to power main 57. Switch 62 opens thereby breaking circuit 60 to relay coils 61 and 55, and breaking circuit 69 to relay coil 70.

De-energization of relay coil 55 opens switch 58 and thereby breaks its own holding circuit. De-energization of solenoid 70 opens switch 71 and thereby breaks circuit 72 to solenoid 73 which permits the spring 69 to retract plunger 74, and urge the roller 77 into engagement with the periphery of the control cam 78. De-energization of the solenoid 61 causes the switch member 63 to open circuit 67 to solenoid 35 and close circuit 66 to solenoid 43. This results in the solenoid 43 urging the locking plunger into engagement with the periphery of plate 32.

The control cam 78 has a pair of diametrically opposite lobes 108 and 109 of approximately 90° in extent which are of greater radii than a second pair of diametrically opposite portions 110 and 111. The lobes 108 and 109 are of sufficient radii that when the roller 77 engages them, they will not permit sufficient movement of the plunger 76 by the spring 79 to open switch 80. The reason for this is that switch 80 controls the motor starting relay 82 and de-energization of this relay will open the power circuit to motor 23 and it is not desirable for this to happen until one of the notches 34 in the locking plate 32 is within at least 45° of the plunger 33. This is for the reason that the remainder of the circuit includes means for inching the headstock into position. Since substantially 45° of rotary movement is sufficient to stop the headstock face plate and slowly bring it into position, it is not desirable that this movement be any greater because too much of the productive time of the machine would be lost.

Therefore after switch 71 is opened the next step depends upon whether the roller 77 engages the lobes 108 and 109 or the intermediate portions 110 and 111. If it engages one of the lobes, rotation of the headstock will continue until the roller engages either the portion 110 or 111. When this occurs, the switch 80 will open, breaking the circuit to relay coil 82 and thereby opening the circuit to motor 23, and closing the circuit through the back contacts 84 and 85. This will close a circuit from power main 56 and contacts 84—85 to circuit 112, which has serially arranged therein a pair of contacts 113 and 114 of a zero speed switch 115. The circuit 112 continues through switch 115 to relay coil 116 of the motor reversing switch 117.

The zero speed switch is a commercial product which may be purchased and attached for actuation by the motor shaft, and within this switch is a viscous clutch which forms a yielding driving connection to a switch member diagrammatically illustrated in Figure 6 as the switch member 118, whereby upon rotation of the motor in a clockwise direction, the switch 118 will be thrown to the right and thereby interconnect contacts 113 and 114. The actual construction of this rotary switch mechanism is shown and described in U. S. Patent 1,677,008 and further description thereof is not believed to be necessary. Suffice it to say that while the motor 23 is rotating in a clockwise direction that the switch member 118 closes contacts 113 and 114, and that when the speed of the motor drops below a prescribed amount, the switch member 118 is returned by spring 119, thus closing contacts 120, 121. Therefore the moment that the starting relay 82 was de-energized, and the contacts 84 and 85 were interconnected by switch 82, a circuit was momentarily established to the reversing relay coil 116, but as soon as the motor slowed down to such a speed that the spring 119 became effective this circuit was broken. Momentary energization, however, of relay coil 116 operated switch 122, which has a first contactor 123 that closes circuit 93 to the motor, a second contactor 124 which closes circuit 90 to the motor, but in reverse relation to that in which they were connected by the switch 83. This would tend to cause reverse rotation of the motor, and thus acts as a momentary brake serving to stop the motor. The momentary closing of switch 122 also effected interconnection of contacts 125, 126 thereby connecting circuit 69 to circuit 127 leading to relay coil 128. Energization of this relay coil closes switch 101 which completes a holding circuit for the relay coil by interconnecting contacts 129 and 130. Switch 101 will therefore remain closed after switch 122 opens.

Switch 101 has a contactor 131 which interconnects contacts 132, 133 thereby interconnecting circuit 69 to circuit 134, which leads to contact 121 of the zero speed switch 115. The switch 101 has another contactor 135 which interconnects 100 to contact 136 leading to relay coil 102, but since circuit 99 is open at this moment, the relay 102 will not be energized.

It will now be apparent that when the switch 80 opened, the following sequence of actions took place. The motor starting switch 83 opened, and in so doing closed the motor reversing switch 117, thereby reversely connecting the motor 23 to its power lines, and simultaneously closed switch 101 which completed a circuit with contact 121 of the zero speed switch with the resultant effect that the closing of the reversing switch slowed the motor 23 to a sufficiently low speed that the zero speed switch 118 was returned to interconnect contacts 120, 121. This broke the circuit to the reverse switch 117, and completed the circuit to the starter relay 82 again, closing the starter switch 83, and interconnecting contacts 97 and 96, whereby the circuit is now complete to relay coil 102, since the switch 101 is closed. Energization of relay coil 102 opened switch 115 thereby making a second break in the circuit to the reverse relay coil 116.

Thus when the motor 23 slowed down to such a speed that the zero speed switch was thrown by the spring 119, the circuit to the reverser relay coil was broken, the circuit to the starter relay 82 was re-established, and the relay coil 102 was energized to open switch 115 which prevented re-establishing the circuit to the reverse relay 116 when the zero speed switch 118 was returned again.

When the relay coil 102 opened switch 115 it closed contacts 137 and 138 thereby completing its own holding circuit from circuit 69, which is a branch of power line 56, to power line 57. It should be remembered that the motor is now rotating at a very slow speed permitting the lock plunger 33 to drop into notch 34 as it comes into a position opposite the plunger. Should the motor speed up, it will throw the zero speed switch and thereby de-energize the relay 82 and open the starting switch 83.

Thus the motor 23 is brought to a stop by opening the starter switch, then momentarily closing the reversing switch to brake the speed of the motor below that necessary to actuate the zero speed switch, which speed is sufficiently low to insure that the locking plunger will drop into place. When the locking plunger drops into locking position, the switch 68 will open thereby opening circuit 69 and breaking the holding circuits to relays 102, 128, and 103' whereby the switch members thereof will return to a starting position.

I claim:

1. In a machine tool having a headstock and a work loading mechanism for moving a work piece into co-axial alignment with said headstock, said headstock having a work supporting center and work driving pins and means for inserting said center and pins in the end of a work piece, the combination with an electric motor for driving said pins, of an electrical control circuit for said motor, including a starting push button switch and interlock switches associated with said work loading means and said inserting means to prevent starting of said motor until a work piece has been positioned in axial alignment with said headstock and the center and driving pins have been inserted in the work.

2. In a machine tool having a work loader and power actuable means for inserting a center and driving pins in the work, the combination with an electric motor for driving said pins, of an electrical control circuit for said motor, including a starting relay, a pilot relay for initially causing energization of the starting relay, a control circuit for said pilot relay, including serially arranged switches adapted to be closed by said work loader and by said power actuable means respectively for closing said circuit after the work has been positioned and the center and driving pins inserted in the work, and a manually operable switch serially connected with said first two named switches for finally completing the circuit to effect actuation of said pilot relay.

3. In a machine tool having a power driven face plate, an electric motor for actuating said plate, and a plunger for locking said plate, the combination of an electrical control circuit for said motor and said plunger, including a starter switch for said motor, electrically operable means for withdrawing said plunger, and sequentially operable relays for causing withdrawal of said plunger and subsequent starting of said motor.

4. In a machine tool having a headstock, a work driving pin supported by said headstock for reciprocatory and rotary movement, power operable means carried by the headstock for effecting reciprocation of said pin into and out of engagement with a work piece, power operable means for rotating said pin, an electrical control circuit for said last named means, including an interlock switch operable by said first named power operable means for preventing rotation of said pin until the same has been inserted in a work piece.

5. In a machine tool having a headstock mechanism and a driving pin supported for rotation by said headstock, the combination with means for presenting work to the driving pin having a driving pin hole located in the end thereof, said means presenting the work with the driving pin hole in the same angular position with respect to the axis thereof, power operable means for rotating said driving pin, including an electrical control circuit, and means in said circuit for stopping said power operable means and actuating said locking means whereby the work driving pin will be stopped in a position opposite to the driving pin hole in the next work piece presented thereto.

6. In a machine of the character described, having a headstock and means to present successive work pieces in definite angular position with respect to said headstock, said headstock having a rotatable driving member, said driving member having a portion for driving engagement with the work when in said angular position, means for driving said member, means for stopping said member at the completion of a tooling operation in proper angular position for engagement with a successively presented work piece, and means activated by presentation of a work piece for shifting the driving member into operative engagement with the presented work piece.

7. In a machine of the character described, having a headstock and means to present successive work pieces in definite angular position with respect to said headstock, said headstock having a rotatable driving member, said driving member having a portion for driving engagement with the work when in said angular position, means for driving said member, means for stopping said member at the completion of a tooling operation in proper angular position for engagement with a a successively presented work piece, means activated by presentation of a work piece for shifting the driving member into operative engagement with the presented work piece, and means actuable by said shifting of the driving member for initiating rotation of the driving member.

8. In a machine of the character described, having a headstock and means to present successive work pieces in definite angular position with respect to said headstock, said headstock having a rotatable driving member, said driving member having a portion for driving engagement with the work when in said angular position, means for driving said member, means for stopping said member at the completion of a tooling operation in proper angular position for engagement with a successively presented work piece, means activated by presentation of a work piece for shifting the driving member into operative engagement with the presented work piece, means actuable by said shifting of the driving member for initiating rotation of the driving member, a tool for effecting a machining operation on the work piece, means for effecting relative approach and retraction of said tool and work piece, and means actuated during said relative retraction for checking the rotation of the driving member.

9. In a machine of the character described, having a headstock and means to present successive work pieces in definite angular position with respect to said headstock, said headstock having a rotatable driving member, said driving member having a portion for driving engagement with the work when in said angular position, means for driving said member, means for stopping said member at the completion of a tooling operation in proper angular position for engagement with a successively presented work piece, means activated by presentation of a work piece for shifting and driving member into operative engagement with the presented work piece, means actuable by said shifting of the driving member for initiating rotation of the driving member, a tool for effecting a machining operation on the work piece, means for effecting relative approach and retraction of said tool and work piece, means actuated during said relative retraction for checking the rotation of the driving member, and means for effecting slow angular rotation of said driving member subsequent to the action of the rotation checking means thereon.

WINTHROP TRIBLE.